(12) United States Patent
Kanada et al.

(10) Patent No.: US 11,309,777 B2
(45) Date of Patent: Apr. 19, 2022

(54) ROTATING ELECTRICAL MACHINE

(71) Applicant: TOYOTA JIDOSHA KABUSHIKI KAISHA, Toyota (JP)

(72) Inventors: Keiu Kanada, Miyoshi (JP); Daisuke Ichigozaki, Toyota (JP); Kazuaki Haga, Toyota (JP); Motoki Hiraoka, Toyota (JP); Daichi Maruyama, Nagoya (JP); Hisamitsu Toshida, Toyota (JP); Kyoko Nakamura, Nagoya (JP); Akira Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/192,263

(22) Filed: Mar. 4, 2021

(65) Prior Publication Data

US 2021/0281153 A1 Sep. 9, 2021

(30) Foreign Application Priority Data

Mar. 9, 2020 (JP) .............................. JP2020-040132

(51) Int. Cl.
| | |
|---|---|
| *H02K 1/27* | (2006.01) |
| *H02K 21/02* | (2006.01) |
| *H02K 1/276* | (2022.01) |
| *H02K 1/272* | (2022.01) |
| *H02K 1/274* | (2022.01) |

(52) U.S. Cl.
CPC ........... *H02K 21/029* (2013.01); *H02K 1/272* (2013.01); *H02K 1/274* (2013.01); *H02K 1/276* (2013.01); *H02K 1/2773* (2013.01)

(58) Field of Classification Search
CPC .................. H02K 1/272–1/278; H02K 21/029
See application file for complete search history.

(56) References Cited

U.S. PATENT DOCUMENTS

| | | | | |
|---|---|---|---|---|
| 2011/0057533 A1* | 3/2011 | Murakami | ........... | H02K 1/2766 310/156.43 |
| 2013/0069470 A1* | 3/2013 | Jurkovic | .............. | H02K 1/2766 310/156.53 |

FOREIGN PATENT DOCUMENTS

JP 2014-103789 A 6/2014

\* cited by examiner

*Primary Examiner* — Ramon M Barrera
(74) *Attorney, Agent, or Firm* — Sughrue Mion, PLLC

(57) ABSTRACT

A rotating electrical machine capable of obtaining a higher torque while limiting the amount of permanent magnets used. A magnetic pole of a rotor includes an auxiliary magnet embedded in a rotor core and at least one main magnet arranged on an outer circumferential side than the auxiliary magnet of the rotor. In each magnetic pole, the distance from an end of the main magnet, the end facing the auxiliary magnet, to the auxiliary magnet facing the main magnet is shorter than the length of the main magnet in the radial direction. In a cross-section orthogonal to the rotation axis of the rotating electrical machine, the main magnets of each magnetic pole are arranged so as to be asymmetrical about a virtual line passing the rotation axis and axisymmetrically dividing the auxiliary magnet.

3 Claims, 11 Drawing Sheets

| Model | Example 1 (Model 1) | Example 3 (Model 4) |
|---|---|---|
| Model (One magnetic pole) | | |
| Symmetry | Asymmetric | Asymmetric |
| Magnetizing direction | Main magnet: circumferential direction<br>Auxiliary magnet: radial direction | Main magnet: circumferential direction<br>Auxiliary magnet: radial direction |

ROTATING ELECTRICAL MACHINE

CROSS REFERENCE TO RELATED APPLICATIONS

The present application claims priority from Japanese patent application JP 2020-040132 filed on Mar. 9, 2020, the entire content of which is hereby incorporated by reference into this application.

BACKGROUND

Technical Field

The present disclosure relates to a rotating electrical machine, and particularly to a rotating electrical machine including a rotor in which permanent magnets are embedded in a rotor core, and a stator positioned on the outer circumference of the rotor.

Background Art

As such type of rotating electrical machine, the one including a rotor having permanent magnets embedded in a rotor core made of a soft magnetic material, and a stator positioned on the outer circumference of the rotor has conventionally been proposed. The permanent magnets include a first magnet to be magnetized in the circumferential direction of the rotor, and a second magnet to be magnetized in the radial direction of the rotor. The magnetic poles of the rotor each have the second magnet and the first magnet contacting the second magnet (see, for example, JP 2014-103789 A).

SUMMARY

The rotating electrical machine disclosed in JP 2014-103789 A, however, uses a large amount of permanent magnets to be embedded in the rotor relative to the torque to be output by the rotating electrical machine, which likely causes a higher cost of the rotating electrical machine.

The present disclosure has been made in view of the foregoing, and provides a rotating electrical machine capable of obtaining a higher torque while limiting the amount of permanent magnets used.

In view of the foregoing, the rotating electrical machine according to the present disclosure includes a rotor with permanent magnets embedded in a rotor core made of a soft magnetic material, and a stator positioned on the outer circumference of the rotor, in which the permanent magnets include a main magnet arranged so as to be magnetized in the radial direction or the circumferential direction of the rotor, and an auxiliary magnet arranged so as to be magnetized in the radial direction of the rotor, the auxiliary magnet includes a plurality of auxiliary magnets, the plurality of auxiliary magnets being embedded in the rotor core so as to surround the rotation axis of the rotor in the cross-section orthogonal to the rotation axis, the main magnet includes a plurality of main magnets, the plurality of main magnets being embedded in the rotor core so as to extend from the auxiliary magnets in the outer circumferential direction of the rotor, a plurality of magnetic poles of the rotor is formed around the rotation axis, the magnetic poles each having the auxiliary magnet and at least one of the main magnets arranged on the outer circumferential side than the auxiliary magnet of the rotor, in each magnetic pole, the distance from an end of the main magnet, the end facing the auxiliary magnet, to the auxiliary magnet facing the main magnet is shorter than the length of the main magnet in the radial direction, and in the cross-section orthogonal to the rotation axis, the main magnet of each magnetic pole is arranged such that the permanent magnets are arranged asymmetrically about a virtual line passing the rotation axis and axisymmetrically dividing the auxiliary magnet of each magnetic pole.

According to the rotating electrical machine of the present disclosure, in each magnetic pole, the main magnet is magnetized in the radial direction or the circumferential direction of the rotor and the auxiliary magnet is magnetized in the radial direction of the rotor. Further, in each magnetic pole, the main magnet is arranged such that the permanent magnets of each magnetic pole are arranged asymmetrically about the virtual line. Therefore, as is also evident from analysis results that will be described later, when the rotating electrical machine is driven, the vector of the magnetic flux of the main magnets directed toward the stator (teeth thereof) is assisted by the magnetic flux from the auxiliary magnet to be formed so as to be inclined relative to the radial direction of the outer circumferential surface of the rotor. Resultantly, a vector as a driving force of the rotor is generated along the tangential direction of the rotor from the outer circumferential surface of the rotor, so that the torque of the rotating electrical machine can be secured even with a fewer amount of magnets. It should be noted that since the distance from the end of the main magnet, the end facing the auxiliary magnet, to the auxiliary magnet facing the main magnet is shorter than the length of the main magnet in the radial direction, the magnetic flux flowing between the main magnet and auxiliary magnet can be reduced, thereby further increasing the magnet torque obtained by the permanent magnets.

The state of being "arranged so as to be magnetized in the radial direction of the rotor" in the present disclosure means that the magnets (main magnet or auxiliary magnet) are arranged such that the direction of magnetization of the magnets at least partially corresponds to the radial direction of the rotor. Meanwhile, the state of being "arranged so as to be magnetized in the circumferential direction of the rotor" means that the direction of magnetization of the magnet (main magnet) does not correspond to the radial direction, but is formed on the magnet so as to cross the radial direction of the rotor.

In some embodiments, the main magnets are arranged so as to be magnetized in the circumferential direction of the rotor. Herein, as is also evident from the results of analysis conducted by the inventors, when the main magnets are arranged so as to be magnetized in the radial direction of the rotor, the vector of the magnetic flux of the main magnets formed in the magnetic pole is difficult to be formed so as to be inclined relative to the radial direction of the outer circumferential surface of the rotor. In this embodiment, since the main magnets are arranged so as to be magnetized in the circumferential direction of the rotor, the vector of the magnetic flux of the main magnets is likely to be formed so as to be inclined relative to the radial direction of the rotor. Consequently, with such an inclined vector of the magnetic flux, the torque of the rotating electrical machine can be increased.

In some embodiments, each magnetic pole has two or more main magnets, and the soft magnetic material is disposed between the main magnets. This allows the magnetic flux to flow into the soft material between the main magnets, so that the torque of the rotating electrical machine can be increased even with a fewer amount of magnets.

According to the present disclosure, a higher torque can be obtained while limiting the amount of permanent magnets used.

DETAILED DESCRIPTION

Figure 1:
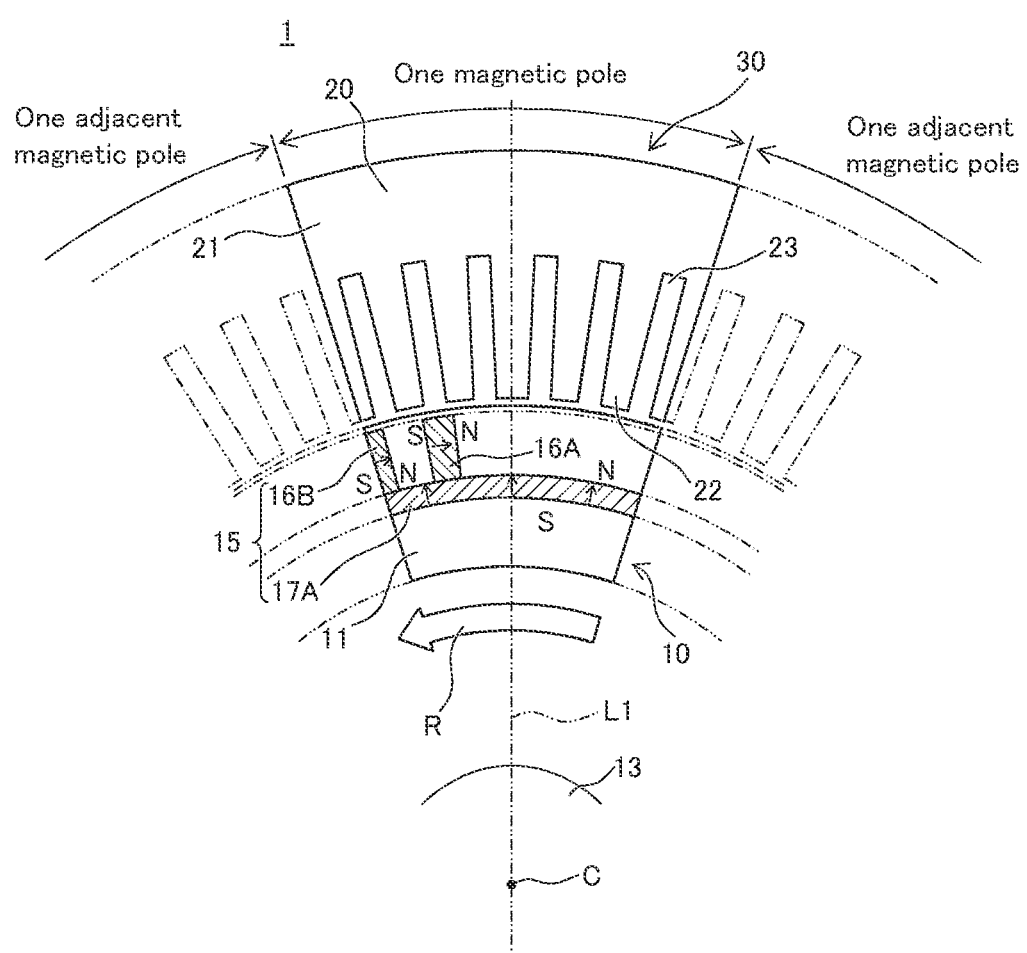
FIG. 1 is a schematic cross-sectional view of a main part of a rotor and a stator showing an embodiment of a rotating electrical machine according to the present disclosure, as is cut in a direction orthogonal to the rotation axis of the rotating electrical machine.
Figure 2:
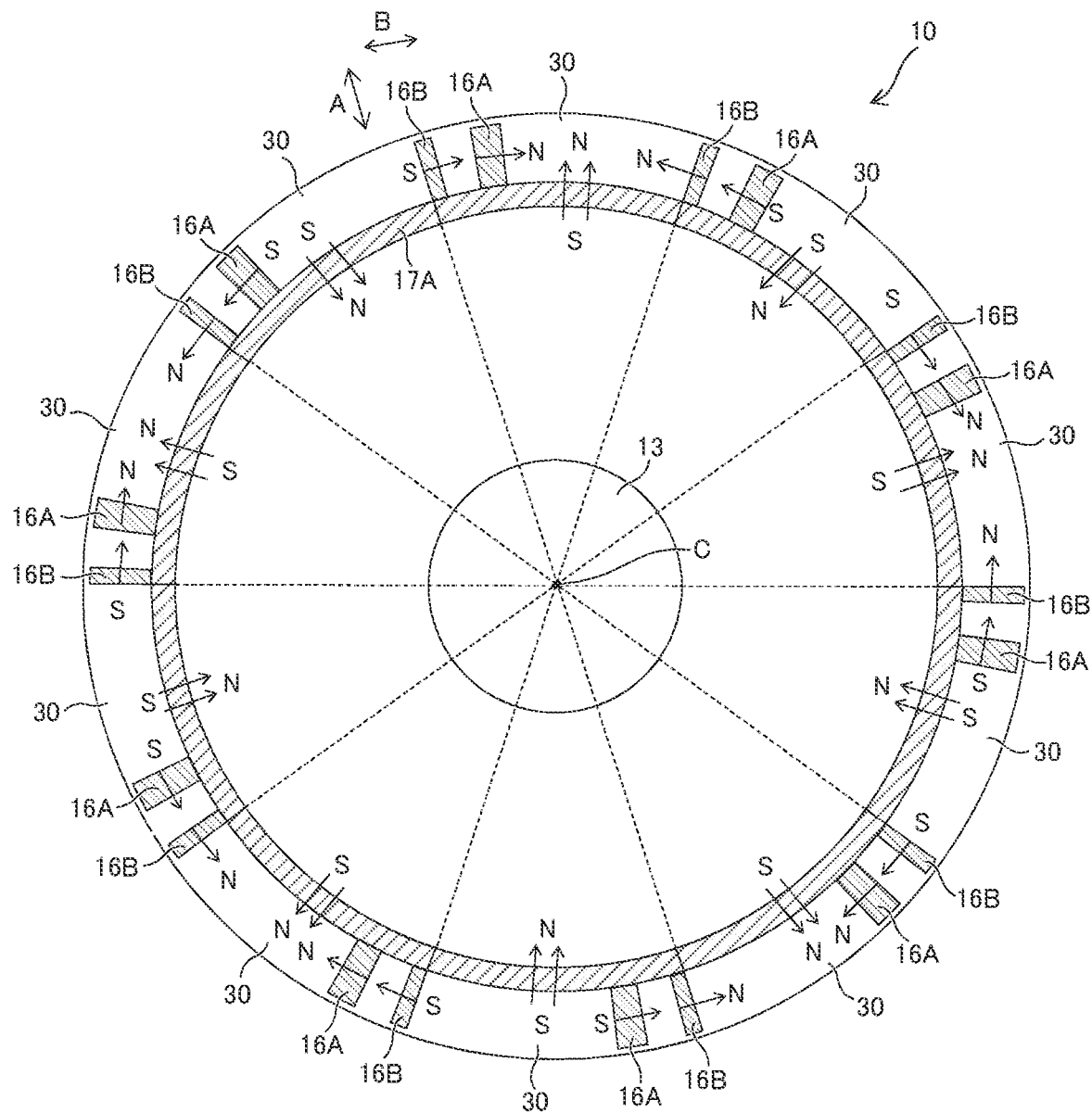
FIG. 2 is a schematic cross-sectional view showing the overall structure of the rotor illustrated in FIG. 1.
Figure 3A:
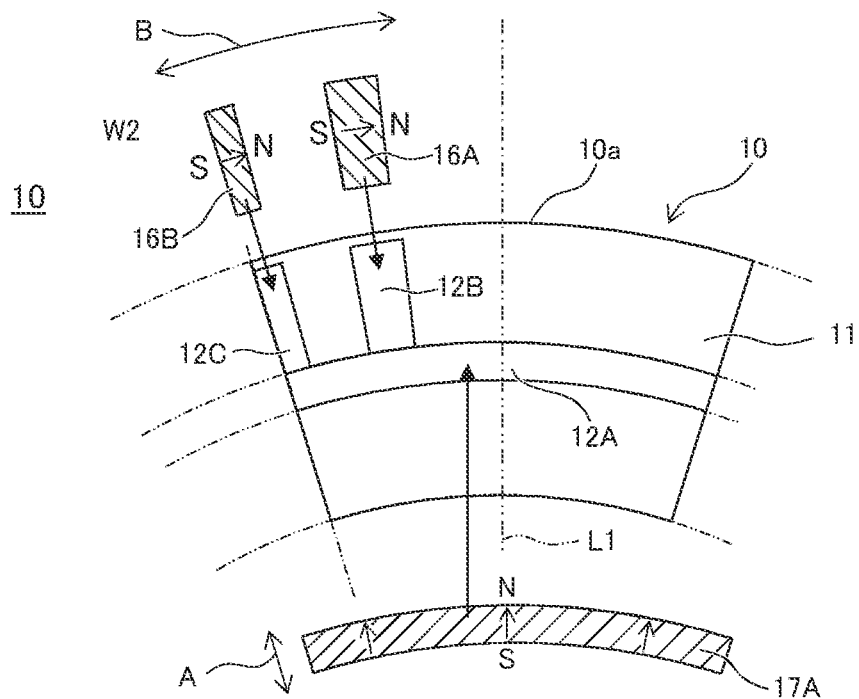
FIG. 3A is an enlarged view illustrating in detail main magnets and auxiliary magnet in one magnetic pole of the rotating electrical machine illustrated in FIG. 1.
Figure 3B:
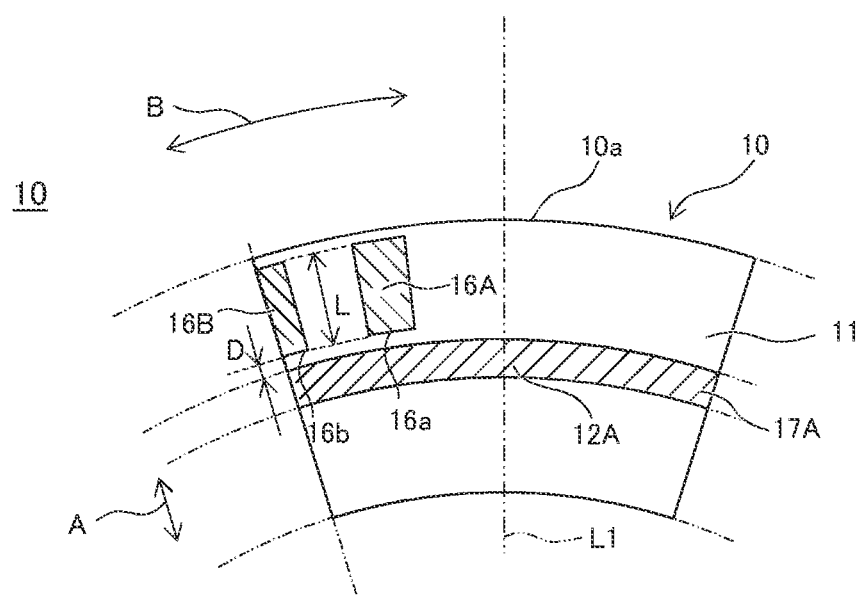
FIG. 3B is an enlarged view illustrating in detail the main magnets and auxiliary magnet in one magnetic pole according to a modification of the rotating electrical machine illustrated in FIG. 1.
Figure 4:
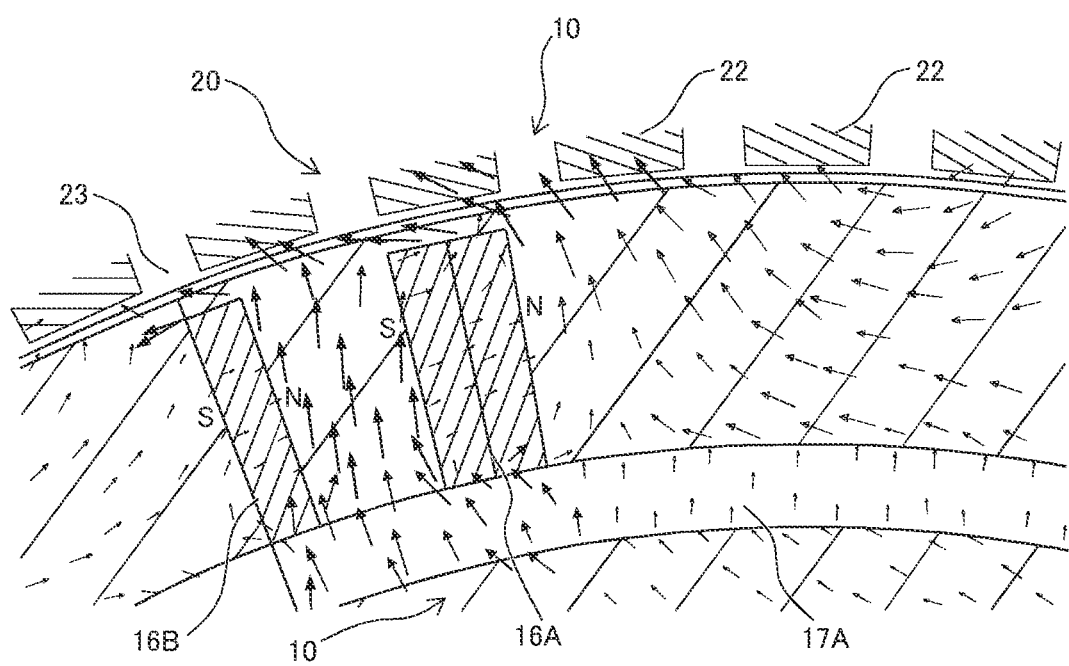
FIG. 4 is a schematic view showing a vector of a magnetic flux generated when a coil is energized between the stator and the rotor illustrated in FIG. 1.
Figure 5:
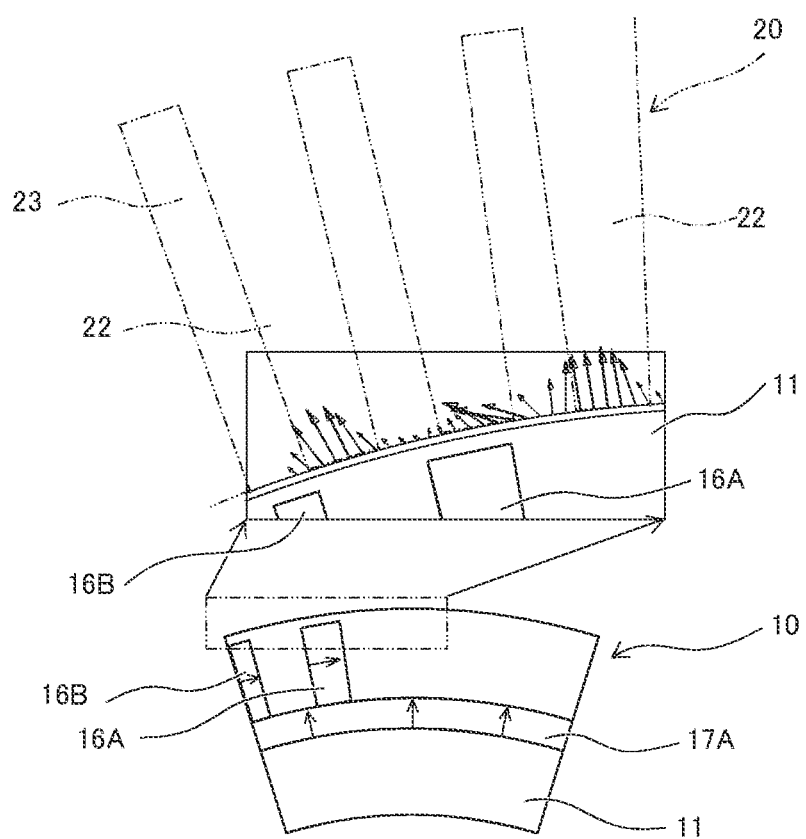
FIG. 5 is a schematic view showing the surface force on the surface of the rotor generated between the stator and the rotator illustrated in FIG. 1.

An embodiment of a rotating electrical machine according to the present disclosure will be detailed below on the basis of the drawings. FIG. 1 is a schematic cross-sectional view of a main part of a rotor and a stator showing an embodiment of a rotating electrical machine according to the present disclosure, as is cut in a direction orthogonal to the rotation axis of the rotating electrical machine. FIG. 2 is a schematic cross-sectional view showing the overall structure of the rotor illustrated in FIG. 1. FIG. 3A is an enlarged view illustrating in detail main magnets and auxiliary magnet in one magnetic pole of the rotating electrical machine illustrated in FIG. 1. FIG. 3B is an enlarged view illustrating a modification of the rotor. FIG. 4 is a schematic view showing a vector of a magnetic flux generated when a coil is energized between the stator and the rotor illustrated in FIG. 1. FIG. 5 is a schematic view showing the surface force on the surface of the rotor generated between the stator and the rotor illustrated in FIG. 1.

In FIGS. 1 and 2, a rotating electrical machine 1 includes a cylindrical rotor 10 and a stator 20, the rotor 10 being disposed on the inner circumferential side of the stator 20 and facing the stator 20 with a clearance in the radial direction, and being adapted to rotate relative to the stator 20. The rotating electrical machine 1 is an IPM (Interior Permanent Magnet) motor including the rotor 10 with permanent magnets 15 embedded in a rotor core 11, and the stator 20 positioned on the outer circumference of the rotor 10.

The rotor 10 is adapted to rotate about a rotation axis C, and a rotary shaft 13 having the rotation axis C as the shaft center is fitted into the rotor core 11. The rotor 10 has a plurality of magnetic poles 30 firmed around the rotation axis C, with the permanent magnets 15 arranged, which will be described later. An even number of magnetic poles 30 are provided, and in the present embodiment, the rotor 10 has ten fan-shaped magnetic poles 30. In this case, the fan-shaped magnetic poles 30 each have a central angle of 36°. Further, the permanent magnets 15 of a pair of adjacent magnetic poles 30 are magnetized in the opposite directions, and in the present embodiment, the permanent magnets 15 of the adjacent magnetic poles 30 are arranged in the same positions.

The rotor core 11 is made of a soft magnetic material, examples of which include those with electromagnetic steel sheets laminated and those obtained by press-forming and then sintering soft magnetic powder. It should be noted that the electromagnetic steel sheets may be joined together with an insulating resin. Examples of the soft magnetic material forming the rotor core 11 include, but not limited to, those having at least one type of magnetic metal selected from a group consisting of Fe, Co, and Ni and at least one type of non-magnetic metal selected from a group consisting of B, C, P. Al, Si, Ti, V, Cr, Mn, Cu, Y, Zr, Nb, Mo, Hf, Ta, and W.

Examples as a representative material of the soft magnetic material include, but not limited to, a FeCo alloy (such as FeCo and FeCoV), FeNi alloy (such as FeNi, FeNiMo, FeNiCr, and FeNiSi), FeAl alloy or FeSi alloy (such as FeAl, FeAlSi, FeAlSiCr, FeAlSiTiRu, and FeAlO), FeTa alloy (such as FeTa, FeTaC, and FeTaN), and FeZr alloy (such as FeZrN).

Examples of the permanent magnet 15 include rare-earth magnets, such as a neodymium magnet containing neodymium, iron, and boron as the main components, and a samarium cobalt magnet containing samarium and cobalt as the main components. The permanent magnet 15 may be other magnets, such as a ferrite magnet and alnico magnet.

The permanent magnets 15 arranged in one magnetic pole 30 include two main magnets 16A and 16B and one auxiliary magnet 17A. As illustrated in FIG. 3A, in the present embodiment, the rotor core 11 has formed therein a magnet insertion hole 12A, into which the auxiliary magnet 17A is inserted, so as to surround the rotation axis C.

Further, the rotor core 11 has formed therein a plurality of magnet insertion holes 12B and 12C, into which the main magnets 16A and 16B are inserted. The plurality of magnet insertion holes 12B and 12C is formed continuously on the outer circumferential side of the magnet insertion hole 12A and radially from the magnet insertion hole 12A. In the present embodiment, the magnet insertion holes 12A to 12C are formed along the rotation axis C, each hole having an opening on one side and a bottom (not shown) on the other side.

It should be noted that in the present embodiment, the adjacent magnet insertion holes 12A to 12C are formed as one continuous hole, but for example, a bridge (partition) may be formed in a portion of the rotor core 11 to separate the magnet insertion holes 12A and 12A that are adjacent in the circumferential direction. Also, a bridge (partition) may be formed in a portion of the rotor core 11 to separate the magnet insertion hole 12A from the magnet insertion holes 12B and 12C. These bridges (partitions) are made of the soft magnetic material forming the rotor core 11 and integrally formed with the rotor core 11.

The magnet insertion holes 12B and 12C, into which the main magnets 16A and 16B are inserted, are formed in the cross-section orthogonal to the rotation axis C of the rotating electrical machine 1, so as to be asymmetrical about a virtual line L1 passing the rotation axis C and axisymmetrically dividing the magnet insertion hole 12A. That is, given that a rotating direction R of the rotor 10 is in the counterclockwise direction, the magnet insertion holes 12B and 12C, into which the main magnets 16A and 16B are inserted, are formed on one side disproportionately relative to the virtual line L1.

In the present embodiment, the auxiliary magnet 17A is inserted into the magnet insertion hole 12A, while the main magnets 16A and 16B are inserted into the magnet insertion holes 12B and 12C. In each magnetic pole 30, the main magnets 16A and 16B are arranged such that the permanent magnets 15 are arranged asymmetrically about the virtual line L1 axisymmetrically dividing one auxiliary magnet 17A of the rotor 10. In the present embodiment, the virtual line L1 corresponds to a line bisecting the central angle of the fan-shaped magnetic pole 30. The "arrangement of the permanent magnets" in the present specification refers to the arrangement of the permanent magnets including both the main magnet and auxiliary magnet that form one magnetic pole.

As illustrated in FIG. 1, in one magnetic pole 30, the main magnets 16A and 16B are arranged such that the permanent magnets 15 including the main magnets 16A and 16B and auxiliary magnet 17A are asymmetrically arranged. In the present embodiment, in each magnetic pole 30, the two main magnets 16A and 16B are arranged on one side (left side in FIG. 1) disproportionately relative to the virtual line L1.

The two main magnets 16A and 16B are arranged so as to be magnetized in a circumferential direction B of the rotor 10. Specifically, as illustrated in FIG. 1 and FIG. 3A, the main magnets 16A and 16B are magnetized in the circumferential direction B, and the two main magnets 16A and 16B are magnetized in the same circumferential direction, and in the present embodiment, the direction is in the clockwise direction about the rotation axis C. It should be noted that the "direction of magnetization" referred to in the present specification is the direction in which the magnetic flux flows out of the north pole, and corresponds to the direction connecting the south pole and the north pole of one magnet.

In the magnetic poles 30 adjacent on the opposite sides of the magnetic pole 30 illustrated in FIG. the main magnets 16A and 16B are arranged so as to be magnetized in the circumferential direction B of the rotor 10 (see FIG. 2). However, the direction of magnetization of the main magnets 16A and 16B of the adjacent magnetic poles 30 is in the counterclockwise direction about the rotation axis C, which is different from that in FIG. 1.

Specifically, the north pole and south pole of the main magnets 16A and 16B of the adjacent magnetic poles 30 are inverted from those of the main magnets 16A and 16B of the magnetic pole 30 illustrated in FIG. 1. In this manner, in the present embodiment, the main magnets 16A and 16B of the magnetic poles 30 are arranged such that the main magnets 16A and 16B of the adjacent magnetic poles 30 are magnetized alternately in the opposite directions.

Further, the magnetic pole 30 illustrated in FIG. 1 is provided with one auxiliary magnet 17A. The auxiliary magnet 17A is in an arc shape and arranged so as to be magnetized outward in a radial direction A. Specifically, the auxiliary magnet 17A illustrated in FIG. 1 is arranged such that the south pole is on the inner circumferential side and the north pole is on the outer circumferential side.

In the present embodiment, in each magnetic pole 30, a distance (shortest distance) D from each of ends 16a and 16b of the main magnets 16A and 16B, the ends facing the auxiliary magnet 17A, to the auxiliary magnet 17A facing the main magnets 16A and 16B is shorter than a length L of each of the main magnets 16A and 16B in the radial direction. Therefore, in the embodiment illustrated in FIG. 1, since the main magnets 16A and 16B and the auxiliary magnet 17A contact with each other, the distance D is zero, thus satisfying the relation. However, as illustrated in FIG. 3B, the main magnets 16A and 16B and the auxiliary magnet 17A do not necessarily contact with each other. In this case, as illustrated in FIG. 3B, the distance D only needs to be shorter than the length L, and the soft magnetic material of the rotor core 11 is disposed between the main magnets 16A and 16B and the auxiliary magnet 17A.

As described above, in either case shown in FIG. 1 or FIG. 3B, the distance D from each of the ends 16a and 16b of the main magnets 16A and 16B, the ends facing the auxiliary magnet 17A, to the auxiliary magnet 17A facing the main magnets 16A and 16B is shorter than the length L of each of the main magnets 16A and 16B in the radial direction. Thus, the magnetic flux flowing between the main magnets 16A and 16B and auxiliary magnet 17A can be reduced, thereby further increasing the magnet torque obtained by the permanent magnets.

Since the rotor 10 has ten magnetic poles, as illustrated in FIG. 2, the rotor core 11 is provided with ten auxiliary magnets 17A. These auxiliary magnets 17A are arranged so as to surround the rotation axis C. The magnetic poles 30 each have the auxiliary magnet 17A and the main magnets 16A and 16B contacting the auxiliary magnet 17A.

In the magnetic poles 30 adjacent on the opposite sides of the magnetic pole 30 illustrated in FIG. 1, the auxiliary magnets 17A are arranged so as to be magnetized in the radial direction A of the rotor 10 (see FIG. 2). However, the auxiliary magnets 17A of the adjacent magnetic poles 30 are magnetized such that the north pole is on the inner circumferential side and the south pole is on the outer circumferential side, and the auxiliary magnets 17A of the adjacent magnetic poles 30 are magnetized inward in the radial direction A, which are different from those in FIG. 1.

Specifically, the north pole and south pole of the auxiliary magnets 17A of the adjacent magnetic poles 30 are inverted from those of the auxiliary magnet 17A of the magnetic pole 30 illustrated in FIG. 1. In this manner, in the present embodiment, the auxiliary magnets 17A of the magnetic poles 30 are arranged such that the auxiliary magnets 17A of the adjacent magnetic poles 30 are magnetized alternately in the opposite directions.

Then, the stator 20 has a tubular stator core 21, from which a plurality of teeth 22 extends toward the rotation axis C in the inner circumferential direction. Therefore, spaces between the plurality of teeth 22 form slots 23, into which coils (not shown) for magnetizing the stator 20 are to be inserted.

The stator 20 is made of a soft magnetic material as with the rotor 10. The stator 20 is configured such that the six teeth 22 face one magnetic pole of the rotor 10. The teeth 22 are wound with a coil (not shown), and magnetized when the coil is energized. In the present embodiment, the way of winding the coil is not particularly limited, but the present embodiment adopts the distributed winding to wind the coil.

The effects of the rotating electrical machine 1 of the present embodiment configured as described above will be described below. When the coil wound around the teeth 22 of the stator 20 is energized, the teeth 22 of the stator 20 are magnetized, and with the magnetic attraction between the main magnets 16A and 16B and the auxiliary magnet 17A of the rotor 10, the torque to rotate the rotor 10 in a counterclockwise direction R is generated.

Specifically, in the rotating electrical machine 1 according to the present embodiment, in the cross-section orthogonal to the rotation axis C of the rotor 10, the virtual line L1 axisymmetrically dividing the auxiliary magnet 17A passes the rotation axis C and axisymmetrically divides the auxiliary magnet 17A in one magnetic pole of the rotor 10. The main magnets 16A and 16B of each magnetic pole 30 are arranged such that the permanent magnets 15 are asymmetrically arranged relative to the virtual line L1, Further, the main magnets 16A and 16B are arranged so as to be magnetized in the circumferential direction of the rotor 10. In addition, in the rotating electrical machine 1, the arc-shaped auxiliary magnets 17A are arranged so as to be magnetized in the radial direction A of the rotor 10.

Therefore, upon energizing the coil to drive the rotating electrical machine 1, as illustrated in FIG. 5, the vector of the magnetic flux in the circumferential direction flowing out of the main magnets 16A and 16B is assisted by the magnetic flux from the auxiliary magnet 17A to be formed so as to be inclined relative to the radial direction of the rotor 10. Since the permanent magnets 15 are asymmetrically arranged, the magnetic flux from the main magnets 16A and 16B disproportionately flows near the main magnets 16A and 16B, so that the magnetic flux (magnetic flux inclined relative to the radial direction of the rotor 10) that contributes to the rotation of the rotor 10 is likely to be formed.

Due to such a magnetic flux formed, a vector as a driving force of the rotor 10 is generated as shown in FIG. 5. This vector increases the torque to drive the rotor 10, so that the rotating electrical machine 1 can obtain a large driving torque even with a fewer amount of permanent magnets 15 used.

Figure 6:
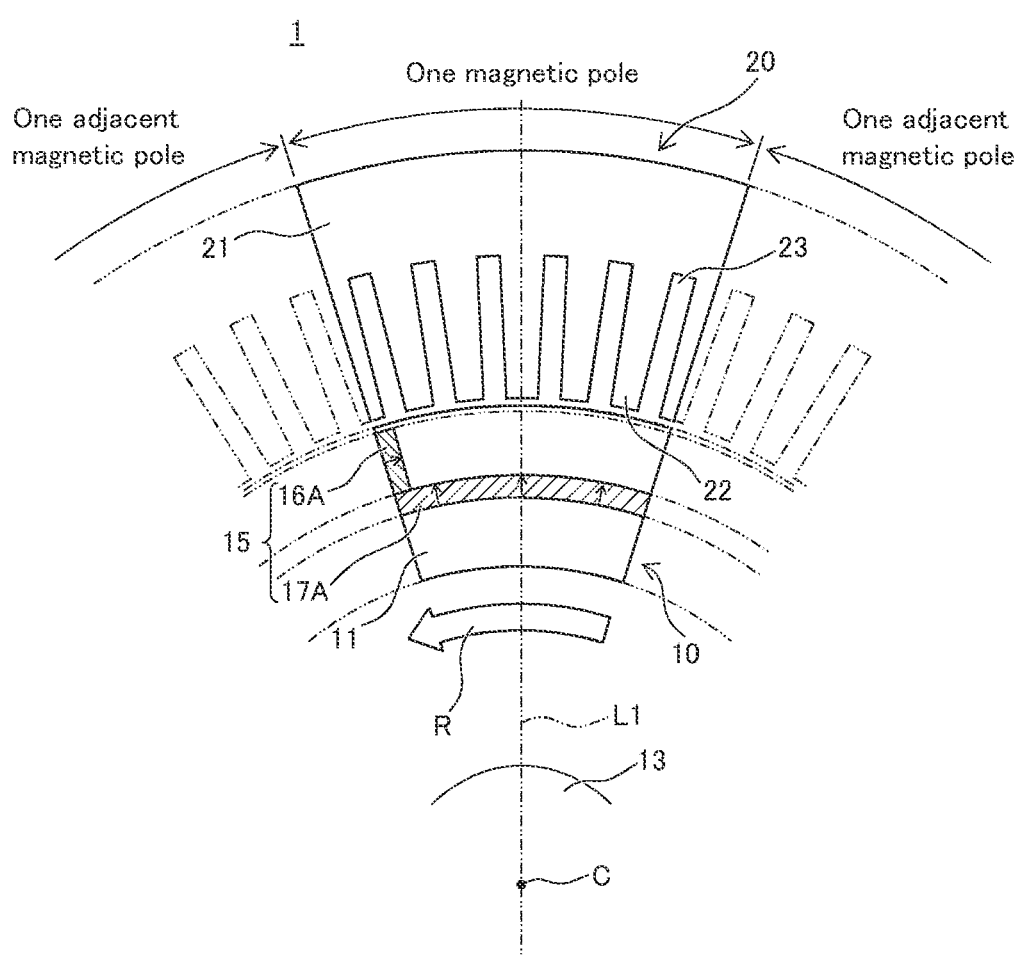
FIG. 6 is an enlarged view of the main part of the rotor according to a modification of the present embodiment.

In the present embodiment, in the cross-section orthogonal to the rotation axis C of the rotating electrical machine 1, the two main magnets 16A and 16B are arranged such that the permanent magnets 15 are arranged asymmetrically about the virtual line L1 passing the rotation axis C and axisymmetrically dividing the auxiliary magnet 17A. However, as illustrated in FIG. 6, even when one main magnet 16A is arranged on one side disproportionately so as to asymmetrically arrange the permanent magnets 15, since the vector of the magnetic flux of the main magnet 16 is assisted by the auxiliary magnet 17A to be inclined, a higher torque can be obtained while suppressing the amount of the permanent magnets 15 used.

In the present embodiment, with the main magnets 16A and 16B magnetized in the circumferential direction B of the rotor 10, the vector of the magnetic flux of the main magnets 16A and 16B is likely to be formed so as to be inclined relative to the radial direction of the rotor 10. Consequently, with such an inclined vector of the magnetic flux, the torque of the rotating electrical machine 1 can be increased.

Figure 9:
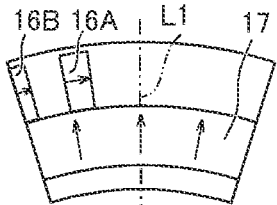
FIG. 9 is a table of views showing the symmetry and magnetizing direction in one magnetic pole of the rotor in Examples 1 and 2 and Comparative Example 1.

It should be noted that as shown in an analysis model (model 2) illustrated in FIG. 9, which will be described later, the main magnets 16A and 16B may be magnetized in the radial direction A. In this case, the vector of the magnetic flux of the main magnets 16A and 16B formed in the magnetic pole 30 is difficult to be formed so as to be inclined relative to the radial direction of the outer circumferential surface of the rotor 10. Therefore, as compared to the case in which the main magnets 16A and 16B are magnetized in the circumferential direction B of the rotor 10, the vector of the magnetic flux of the main magnets 16A and 16B is only slightly inclined relative to the radial direction of the rotor 10. Accordingly, as is evident from the analysis results shown in FIG. 9 and FIG. 10, which will be described later, the torque is decreased by about 25%.

Figure 7:
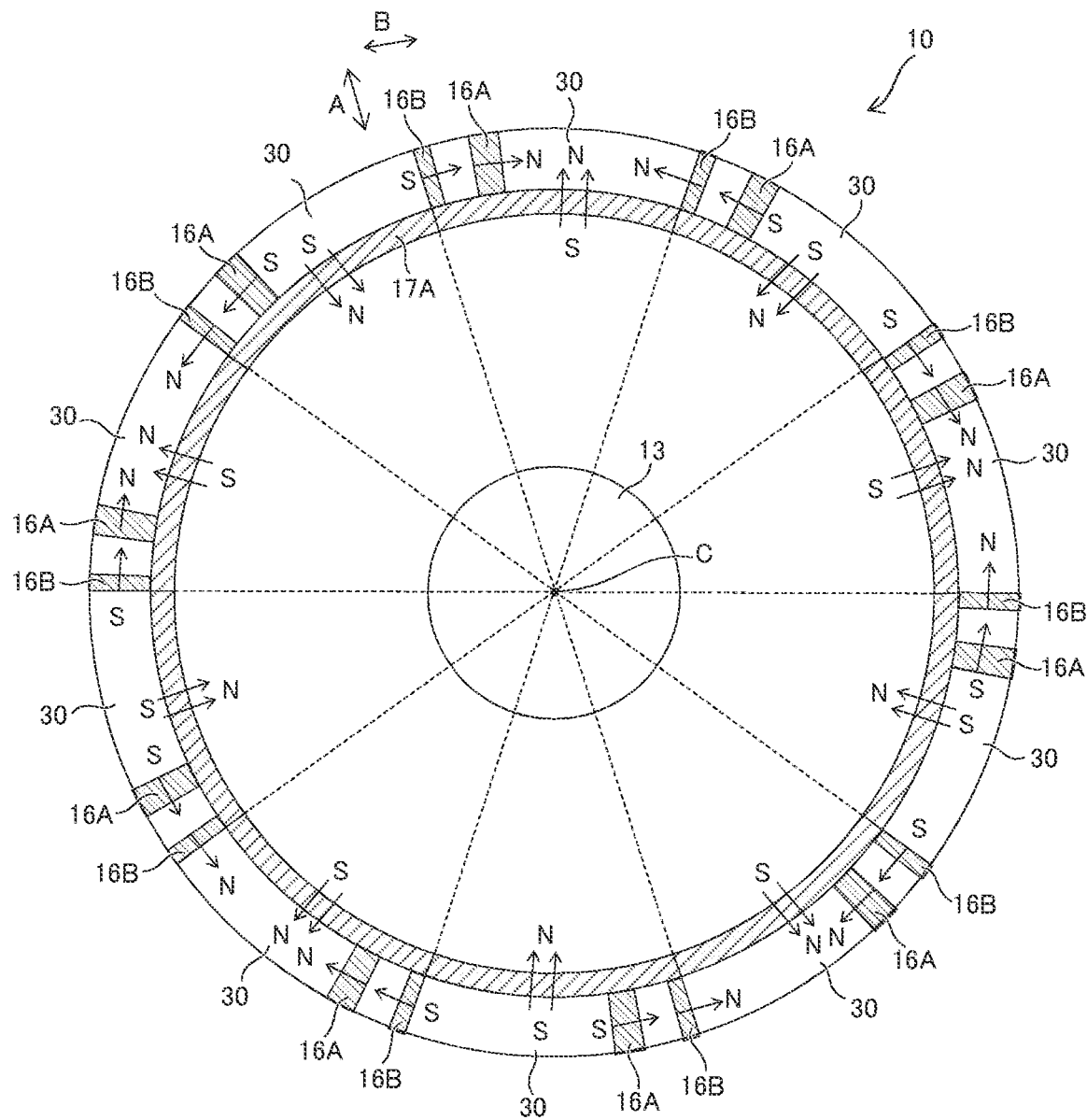
FIG. 7 is a schematic outlined view showing the overall structure of the rotor according to another modification of the present embodiment.

Further, in the embodiment illustrated in FIG. 2, the main magnets 16A and 16B are not exposed from the circumferential surface of the rotor 10, but the end faces of the main magnets 16A and 16B may be exposed from the rotor 10, as shown in FIG. 7, for example. In FIG. 7, the exposed surfaces of the main magnets 16A and 16B partially form the circumferential surface of the rotor 10. With the main magnets 16A and 16B exposed from the circumferential surface of the rotor 10, the soft magnetic material forming the rotor core 11 is not present between the main magnets 16A and 16B and the stator 20. Accordingly, since the magnetic flux of the main magnets can flow with a greater inclination relative to the radial direction of the rotor 10, the torque of the rotating electrical machine 1 can be further increased.

Figure 8:
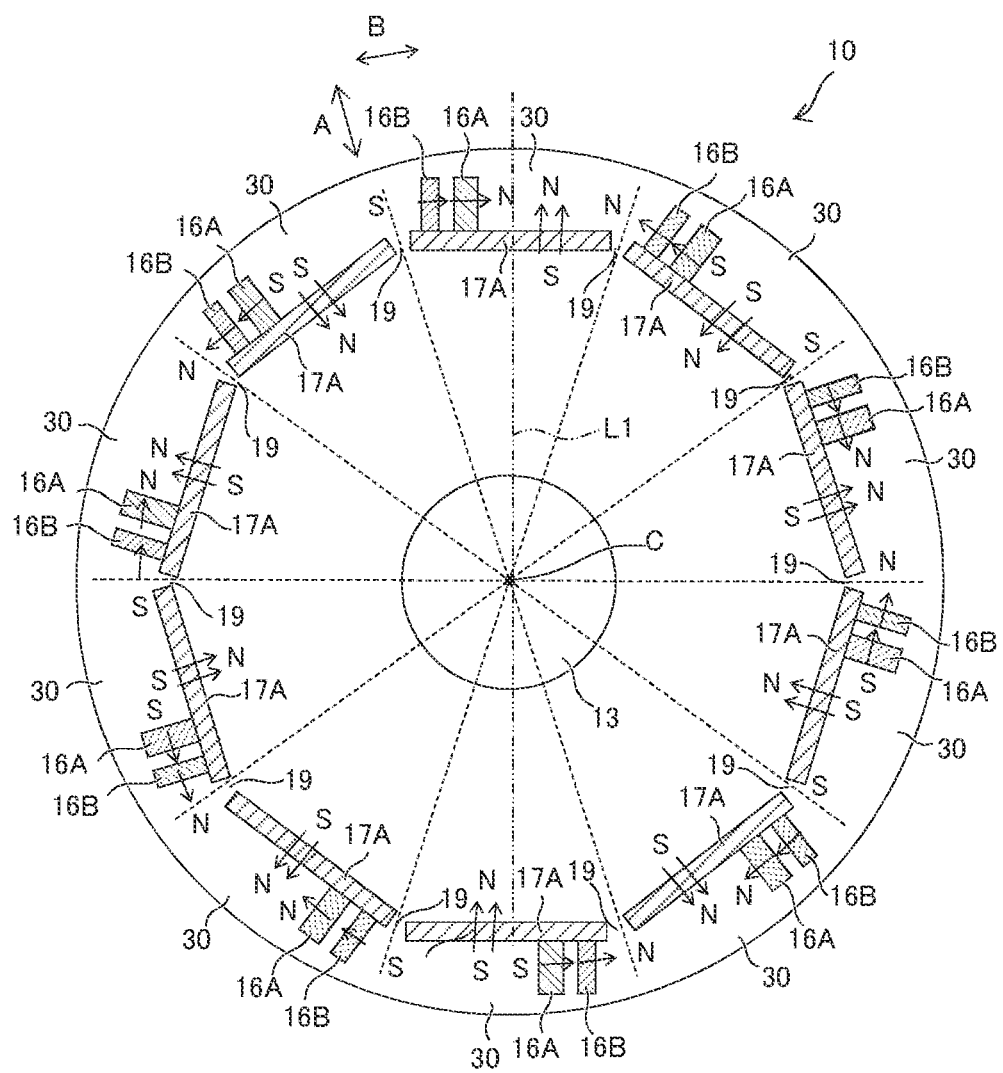
FIG. 8 is a schematic outlined view showing the overall structure of the rotor according to another modification of the present embodiment.

Other than the above, the auxiliary magnets 17A illustrated in FIG. 1 to FIG. 7 are permanent magnets in an arc shape, hut may be, for example, those in a flat shape as illustrated in FIG. 8. Since the permanent magnets in a flat shape are easy to produce, the production cost of the rotor 10 can be reduced. In this case, a portion where the virtual line L1 passes in the auxiliary magnet 17A of each magnetic pole 30 is magnetized in the radial direction A of the rotor 10. In addition, a bridge 19, which is a portion of the rotor core 11, is formed between the auxiliary magnets 17A, so that the strength of the rotor core 11 can be enhanced.

EXAMPLES

The present disclosure will be described below on the basis of the examples.

Example 1

Figure 10:
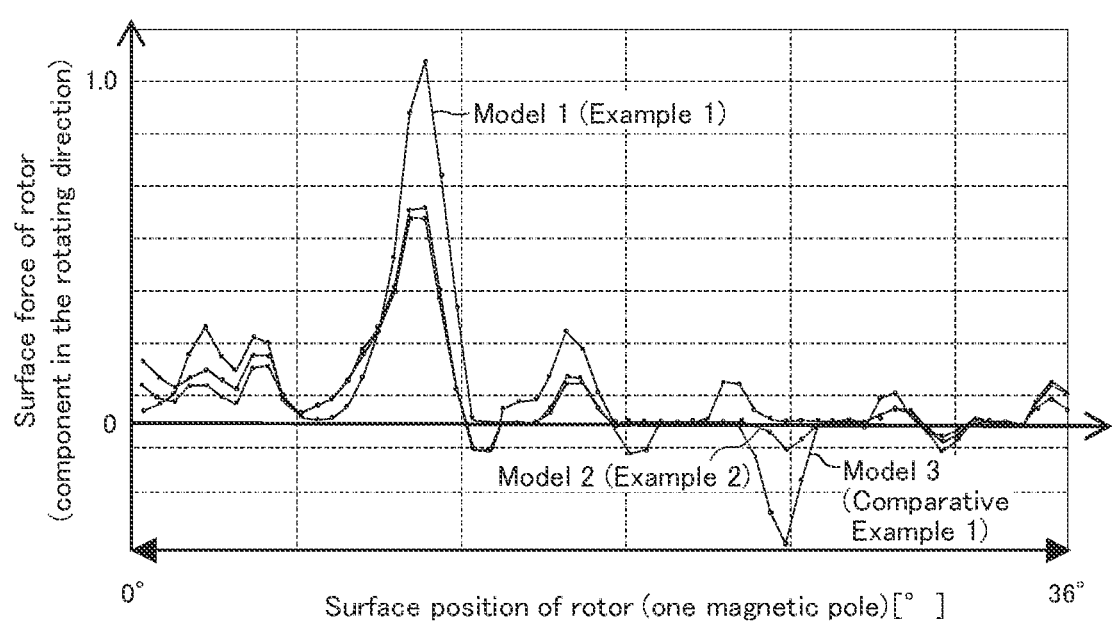
FIG. 10 is a graph showing the surface position and surface force (component in the rotating direction) in one magnetic pole of the rotor in Examples 1 and 2 and Comparative Example 1 illustrated in FIG. 9.
Figures 11, 12:
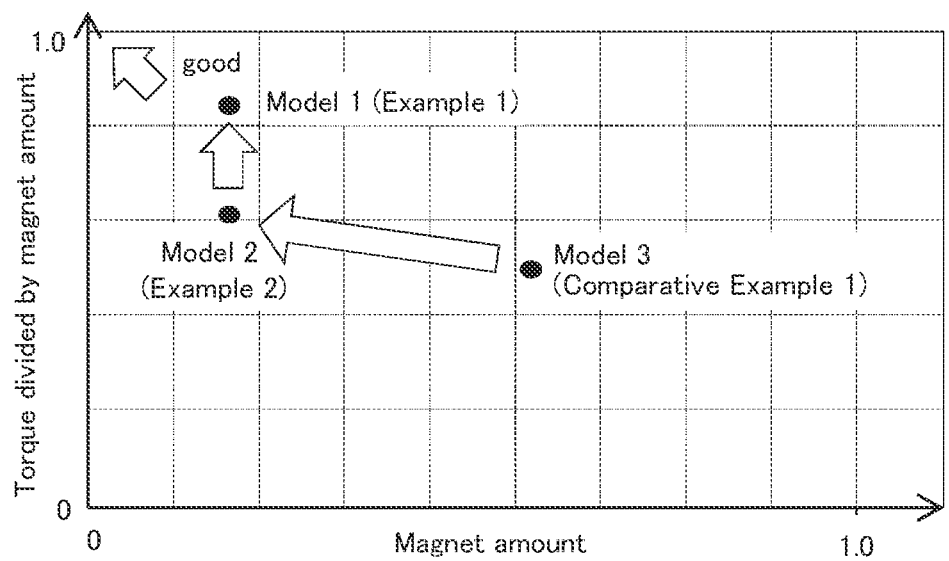
FIG. 11 is a graph showing the magnet amount of the rotor and the results obtained by dividing the torque by the magnet amount in Examples 1 and 2 and Comparative Example 1 illustrated in FIG. 10.
FIG. 12 is a table of views showing the symmetry and magnetizing direction in one magnetic pole of the rotor in Examples 1 and 3.

A model of the rotor 10 illustrated in FIG. 1 was prepared. It should be noted that FIG. 9 illustrates the rotor 10 of FIG. 1 as schematically shown as a model 1. Physical property values were applied to the model 1 to analyze the surface force (component in the rotating direction) in one magnetic pole of the rotor. The results are shown in FIG. 10. It should be noted that the surface force of the rotor represented by the longitudinal axis in FIG. 10 is a value normalized with a predetermined value. In addition, based on the obtained surface force, the torque of the rotating electrical machine was calculated, and a value was obtained by dividing the torque by the amount of magnets used in weight (magnet amount). The results are shown in FIG. 11. The results obtained by dividing the torque by the magnet amount represented by the longitudinal axis in FIG. 11 are normalized with a predetermined value.

Example 2

A model 2 was prepared in the same manner as in Example 1. Example 2 differs from Example 1 in that in Example 2, the main magnets 16C and 16D were magnetized in the radial direction of the rotor. Physical property values were applied to the model 2 to analyze the surface force (component in the rotating direction) in one magnetic pole of the rotor. The results are shown in FIG. 10. In addition, based on the obtained surface force, the torque of the rotating electrical machine was calculated, and a value was obtained by dividing the torque by the magnet amount. The results are shown in FIG. 11.

Comparative Example 1

A model 3 was prepared in the same manner as in Example 2. Comparative Example 1 differs from Example 2 in that in Comparative Example 1, the main magnet 16F was arranged so as to be symmetrical about the virtual line L1, that is, the permanent magnets of the model 3 were positioned symmetrically about the virtual line L1. Physical property values were applied to the model 3 to analyze the surface force (component in the rotating direction) in one magnetic pole of the rotor. The results are shown in FIG. 10. In addition, based on the obtained surface force, the torque of the rotating electrical machine was calculated, and a value was obtained by dividing the torque by the magnet amount. The results are shown in FIG. 11.

As shown in FIG. 10, the surface force of the rotor of Example 1 was more likely to be greater than those of Example 2 and Comparative Example 1. Further, the surface forces of Example 2 and Comparative Example 1 were substantially the same. Thus, as shown in FIG. 11, since Example 2 uses a fewer amount of magnets as compared to Comparative Example 1, the value obtained by dividing the torque by the magnet amount in Example 2 is greater than that of Comparative Example 1. Furthermore, since Example 1 and Example 2 use the same amount of magnets, the value obtained by dividing the torque by the magnet amount in Example 1 is greater than that in Example 2.

In view of the foregoing, as in Examples 1 and 2, when the main magnets of each magnetic pole are arranged such that the permanent magnets are arranged asymmetrically about the virtual line L1, a higher torque can be applied to the rotating electrical machine while suppressing the amount of the permanent magnets used.

In particular, as in Example 1, it is considered that with the main magnets magnetized in the circumferential direction of the rotor, the vector of the magnetic flux of the main magnets is likely to be formed so as to be inclined relative to the radial direction of the rotor. As a result, it is considered that as compared to Example 2, Example 1 could have increased the torque of the rotating electrical machine with the inclined vector of the magnetic flux.

Example 3

A model 4 was prepared in the same manner as in Example 1. Example 3 differs from Example 1 in that in Example 3, as illustrated in FIG. 12, the model included a thinner auxiliary magnet 17A and used a reduced amount of magnets by 45%. It should be noted that FIG. 12 also shows the model 1 of Example 1.

Figure 13:
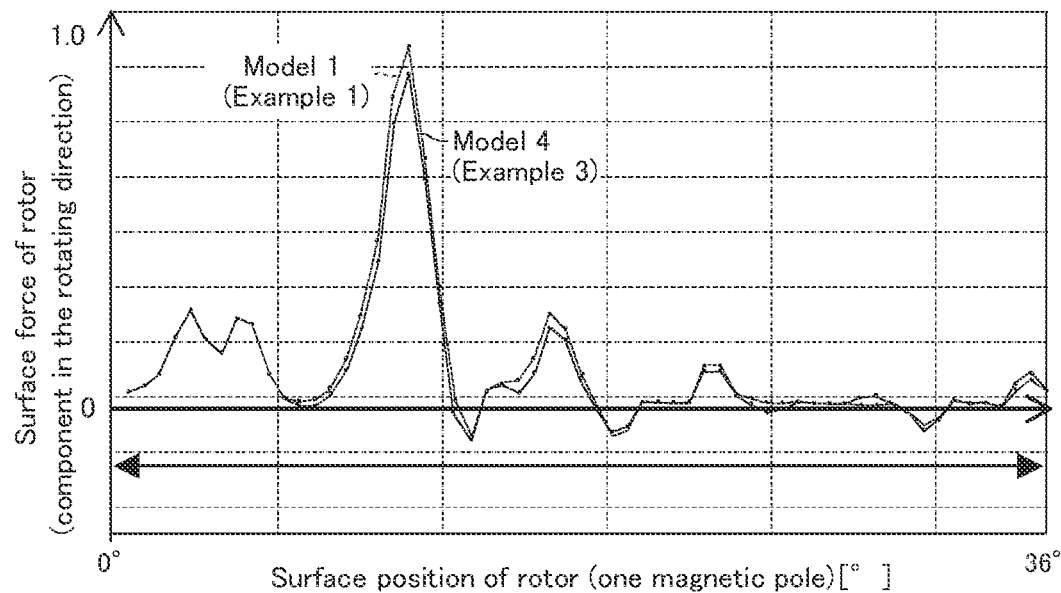
FIG. 13 is a graph showing the surface position and surface three (component in the rotating direction) in one magnetic pole of the rotor in Examples 1 and 3 illustrated in FIG. 12.
Figure 14:
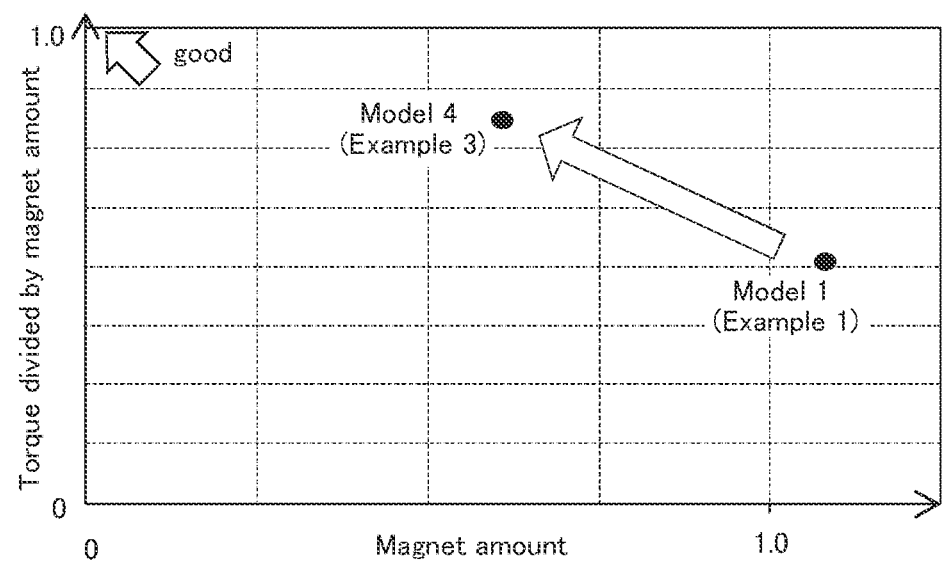
FIG. 14 is a graph showing the magnet amount of the rotor and the results obtained by dividing the torque by the magnet amount in Examples 1 and 3 illustrated in FIG. 12.

Then, physical property values were applied to the model 4, and the surface force (component in the rotating direction) in one magnetic pole of the rotor was analyzed. The results are shown in FIG. 13. In addition, based on the obtained surface force, the torque of the rotating electrical machine was calculated, and a value was obtained by dividing the torque by the magnet amount. The results are shown in FIG. 14. It should be noted that FIG. 13 and FIG. 14 also show the analysis result of the model 1 of Example 1.

As shown in FIG. 13, the surface forces of the rotors of Examples 1 and 3 were substantially the same. That is, the torque of the rotating electrical machine hardly relies on the thickness of the auxiliary magnet. Therefore, since the auxiliary magnet is used for allowing the magnetic flux of the main magnets to be inclined relative to the radial direction of the rotor, it seems difficult to increase the magnet torque by increasing the amount of the auxiliary magnet.

Therefore, as shown in FIG. 14, since Example 3 uses a fewer amount of magnets as compared to Example 1, the value obtained by dividing the torque by the magnet amount in Example 3 is greater than that in Example 1. As a result, in Example 3, a higher torque can be applied to the rotating electrical machine while further suppressing the amount of permanent magnets.

The embodiment of the present disclosure has been described in detail, but the present disclosure is not limited to the above embodiment, and various design changes may be made thereto without departing the spirit of the present disclosure described in the scope of the claims.

What is claimed is:
1. A rotating electrical machine comprising:
a rotor with permanent magnets embedded in a rotor core made of a soft magnetic material; and
a stator positioned on an outer circumference of the rotor, wherein:
the permanent magnets include a main magnet arranged so as to be magnetized in a radial direction or a circumferential direction of the rotor, and an auxiliary magnet arranged so as to be magnetized in the radial direction of the rotor,
the auxiliary magnet includes a plurality of auxiliary magnets, the plurality of auxiliary magnets being embedded in the rotor core so as to surround a rotation axis of the rotor in a cross-section orthogonal to the rotation axis,
the main magnet includes a plurality of main magnets, the plurality of main magnets being embedded in the rotor core so as to extend from the auxiliary magnets in an outer circumferential direction of the rotor,
a plurality of magnetic poles of the rotor is formed around the rotation axis, the magnetic poles each having the auxiliary magnet and at least one of the main magnets arranged on an outer circumferential side than the auxiliary magnet of the rotor,
in each magnetic pole, a distance from an end of the main magnet, the end facing the auxiliary magnet, to the auxiliary magnet facing the main magnet is shorter than a length of the main magnet in the radial direction, and
in the cross-section orthogonal to the rotation axis, the main magnet of each magnetic pole is arranged such that the permanent magnets are arranged asymmetri- cally about a virtual line passing the rotation axis and axisymmetrically dividing the auxiliary magnet of each magnetic pole.

2. The rotating electrical machine according to claim 1, wherein the main magnet is arranged so as to be magnetized in the circumferential direction of the rotor.

3. The rotating electrical machine according to claim 1, wherein each of the magnetic poles has two or more of the main magnets, and the soft magnetic material is disposed between the main magnets.

* * * * *